Oct. 13, 1953 J. J. EBERS 2,655,610

SEMICONDUCTOR SIGNAL TRANSLATING DEVICE

Filed July 22, 1952 3 Sheets-Sheet 1

INVENTOR
J. J. EBERS
BY [signature]
ATTORNEY

Oct. 13, 1953 J. J. EBERS 2,655,610

SEMICONDUCTOR SIGNAL TRANSLATING DEVICE

Filed July 22, 1952 3 Sheets-Sheet 2

INVENTOR
J. J. EBERS
BY [signature]
ATTORNEY

INVENTOR
J. J. EBERS
BY
ATTORNEY

Patented Oct. 13, 1953 2,655,610

UNITED STATES PATENT OFFICE

2,655,610

SEMICONDUCTOR SIGNAL TRANSLATING DEVICE

Jewell J. Ebers, Whippany, N. J., assignor to Bell Telephone Laboratories, Incorporated, New York, N. Y., a corporation of New York Application July 22, 1952, Serial No. 300,235

17 Claims. (Cl. 307—88)

This invention relates to semiconductor signal translating devices and more particularly to such devices of the type now known as junction transistors.

Junction transistors, such as disclosed in Patent 2,569,347, granted September 25, 1951, to W. Shockley, comprise, in general, a body of semiconductive material, for example germanium or silicon, having therein three contiguous zones the intermediate one of which is of the conductivity type, N or P, opposite that of the other two. Connections, termed the emitter and collector, are made to the outer zones respectively and a third connection, termed the base, is made to the intermediate zone. In some constructions, disclosed in the Shockley patent above referred to and discussed in the Physical Review, volume 83, pages 151 to 162 (1951), an additional zone is provided in the body contiguous with the collector zone and of conductivity type opposite that of the collector zone. The collector zone is operated at floating potential. The combination of the collector zone and the two zones adjacent thereto provide what is termed a hook collector, a feature of which is enhancement of the current multiplication factor, designated alpha, of the transistor.

One general object of this invention is to improve semiconductor signal translating devices of the junction type. Another general object of this invention is to facilitate attainment of prescribed performance characteristics for such devices.

More specifically, one object of this invention is to enable ready control of operating characteristics of junction type transistors, and more particularly, and for example, of the effective current multiplication factor of such devices and the relation thereof to the emitter current and the collector saturation current.

Another specific object of this invention is to attain a high effective current multiplication factor concomitantly with a low collector saturation current.

A further object of this invention is to expedite the transfer of semiconductor signal translating devices from a low current or substantially open circuit condition to a high current or closed circuit condition.

A still further object of this invention is to provide control of the several parameters of particular moment in the operation of a transistor as a circuit controlling element, specifically those parameters which determine the transfer of the device from open circuit to closed circuit conditions and the current-voltage characteristics of the device.

In accordance with one feature of this invention, in a junction type transistor having at least three successively arranged junctions, means in addition to the emitter, collector and base connections are provided for controlling the operating characteristics.

More specifically, in accordance with one feature of this invention is a signal translating device wherein the semiconductor body comprises four successively arranged contiguous zones, adjacent zones being of opposite conductivity types, and wherein emitter, collector and base connections are made to the outer zones and one of the intermediate zones respectively, means are provided for controlling the relative potential of the other intermediate zone.

In one illustrative embodiment of this invention, in a device having four zones as above described, individual electrical connections are made to all the zones. Those to the outer two zones serve as emitter and collector, the connection to one intermediate zone serves as the base and the fourth connection serves as a control. The relative potential of the fourth zone may be controlled, for example by impressing a voltage between the two intermediate zones, through a linear or non-linear resistance connected between the control and collector terminals or by a signal source connected between these terminals. As will be pointed out in detail hereinafter, such control enables desired and prescribed alteration in operating characteristics of the device, such as the effective alpha, the saturation current and the impedance presented between the emitter and collector terminals.

The invention and the above noted and other features thereof will be understood more clearly and fully from the following detailed description with reference to the accompanying drawing in which.

Figure 3:
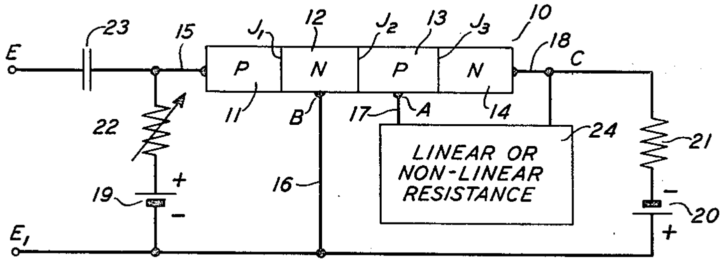
Fig. 3 is a circuit schematic portraying one embodiment of this invention.
Figure 4:
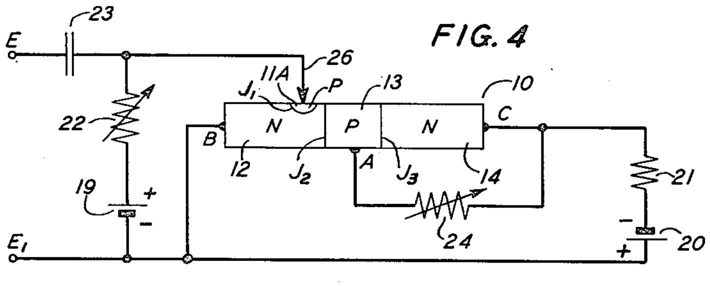
Figure 5:
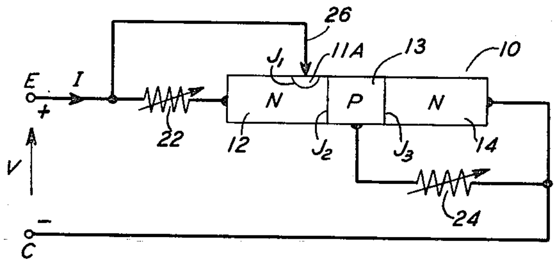
Figure 6:
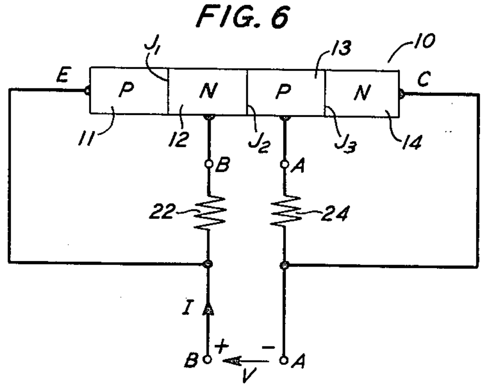

Figs. 4 and 5, similarly to Fig. 3 are circuit schematics depicting other illustrative embodiments of this invention wherein a point contact connection is made to one of the zones;

Fig. 6 illustrates still another embodiment of this invention; and

Figs. 7 to 10, inclusive, are graphs portraying certain operating characteristics of devices constructed in accordance with this invention.

In the drawing, in the interest of clarity, the semiconductive bodies have been shown to a greatly enlarged scale. The magnitude of the enlargement will be apparent from the typical dimensions for illustrative devices presented hereinafter. Also in the drawing, the conductivity type of each zone in a semiconductive body has been indicated by the respective type letter, that is N or P.

Figure 1:
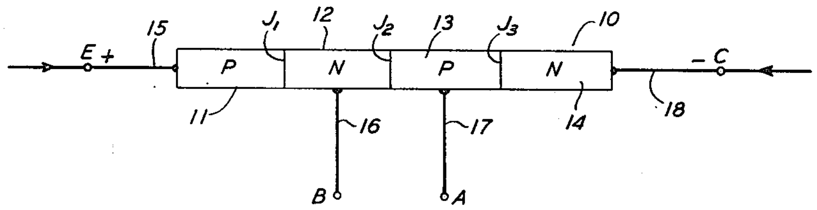
Fig. 1 illustrates diagrammatically a semiconductor signal translating device illustrative of one embodiment of this invention.

Referring now to the drawing, the device illustrated in Fig. 1 comprises a body or bar 10 of semiconductive material, for example germanium or silicon, having therein four zones 11 to 14. Adjacent zones are of opposite conductivity types as indicated so that there are defined in the bar or body three PN junctions $J_1$, $J_2$, and $J_3$. Advantageously the semiconductor body 10 is of single crystal structure throughout. It may be fabricated, for example in accordance with the method disclosed in the application Serial No. 168,184, filed June 15, 1950, of G. K. Teal.

Individual substantially ohmic connections are made to the zones by conductors 15 to 18. The connections to the end or outer zones 11 and 14 may be made by way of metal platings on the ends of these zones. Those to the intermediate zones may be made in the manner disclosed in the application Serial No. 228,483, filed May 26, 1951, of W. Shockley. The device thus may be viewed as a four terminal element, the terminals being designated E, C, B and A in Fig. 1.

The general principles of operation of the device will be understood from the following considerations. Assume that the terminal E is positive and the terminal C is negative, as indicated in Fig. 1. Then, as is evident, the junctions $J_1$ and $J_3$ are biased in the forward direction whereas the junction $J_2$ is biased in the reverse direction. Holes are injected from zone 11 into zone 12 and drift across the latter to produce a hole current $I_1$, across the junction $J_2$. Similarly, electrons are injected from zone 14 into zone 13 and drift across the latter to produce an electron current $I_2$ across the junction $J_2$.

The structure may be viewed as comprising a PNP element 11, 12, 13 and an NPN element 14, 13, 12 with the zones 11 and 14 as the emitter zones of the respective elements and the junction $J_2$ as a collector junction common to the two elements. Also, the structure may be represented circuitwise for practical purposes by the equivalent network depicted in Fig. 2. In this network, $r_{E1}$ and $r_{E2}$ are the resistances of the junctions $J_1$ and $J_3$ respectively and $r_C$ is the resistance of the collector junction $J_2$. The resistances of the junctions $J_1$ and $J_3$, which are forwardly biased as noted above, are small whereas the resistance of the reversely biased collector junction $J_2$ is large.

Figure 2:
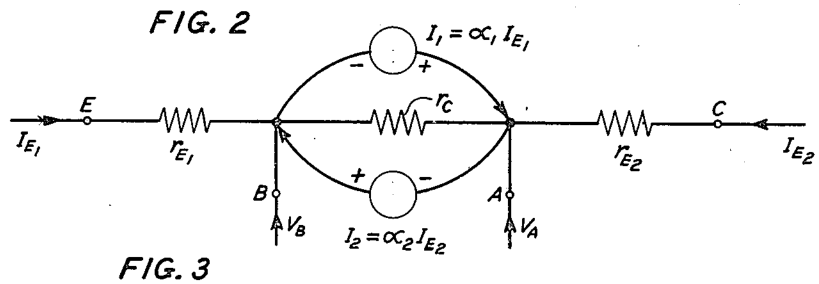
Fig. 2 represents an equivalent circuit for the device shown in Fig. 1.

It can be shown that the hole current which flows across the collector junction $J_2$ is $$I_1=\alpha_1 I_{E_1} \qquad (1)$$

and the electron current which flows across this junction is $$I_2=\alpha_2 I_{E_2} \qquad (2)$$

where $\alpha_1$ and $\alpha_2$ are the current multiplication factors for the PNP and NPN elements referred to hereinabove. These factors, as is known, approach unity as a limit. The current $I_c$ through the collector junction is expressed by the relation $$I_c=I_{cs}\left[\exp.\frac{q}{kT}(V_A-V_B)-1\right] \qquad (3)$$

where $I_{cs}$=the saturation current of the collector junction
$q$=magnitude of electronic charge
$k$=Boltzman's constant
$T$=absolute temperature in degrees Kelvin and $V_A$ and $V_B$ are the voltages of the zones 12 and 13, respectively, as indicated in Fig. 2.

The device of Fig. 1 may be connected for operation as a hook collector transistor as portrayed in Fig. 3 with the terminal E the emitter, terminal C as the collector and terminal B as the base. The junctions $J_1$ and $J_3$ are biased in the forward direction by batteries 19 and 20 respectively whereby, as is apparent, the junction $J_2$ is biased in the reverse direction. The load is represented by the resistor 21. Input signals are applied between terminals E and $E_1$, an appropriate resistance 22 and capacitor 23 being provided as shown. Connected between the terminals A and C is a resistor 24 which may have a linear or non-linear characteristic as will be described hereinafter. In a typical device, the body 10 may be a bar of germanium substantially .030 inch by .030 inch in cross section and with the zones 11, 12, 13 and 14 about .050 inch, .002 inch, .002 inch and .050 inch thick, respectively. The sources 19 and 20 may be of 4 and 40 volts, respectively, the load resistance 21 10,000 ohms, the input resistor 10,000 ohms, and the capacitor 1$\mu f$.

It can be shown readily that the output current of the transistor is given, to a very close approximation and for practical purposes by the relation $$I_L=-\frac{\alpha_1}{1-\frac{\alpha_2}{1+\frac{r_{E2}}{R}}}I_{E1} \qquad (4)$$

where $I_L$ is the current in the load and R is the resistance of resistor 24. The ratio $$\frac{\alpha_1}{1-\frac{\alpha_2}{1+\frac{r_{E2}}{R}}}$$

may be considered as the effective current multiplication factor of the transistor. If the emitter current is zero, the steady state current flowing in the load is given by the equation $$I_{L0}=\frac{I_{cs}}{1-\frac{\alpha_2}{1+\frac{r_{E1}}{R}}} \qquad (5)$$

From the foregoing analysis a number of general conclusions can be drawn. From Equation 5 it is clear that the saturation current of the collector junction is effectively increased due to the presence of junction $J_3$. However, this effect can be reduced by decreasing R. Also it is clear that the effective $\alpha$ is dependent upon a number of factors. These, it has been found, are amenable to ready and prescribed control.

Figure 3A:
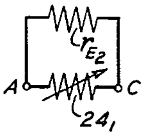
Figs. 3A, 3B and 3C represent particular forms of the resistance between the collector and control connections in the device of Fig. 3.
Figure 8:
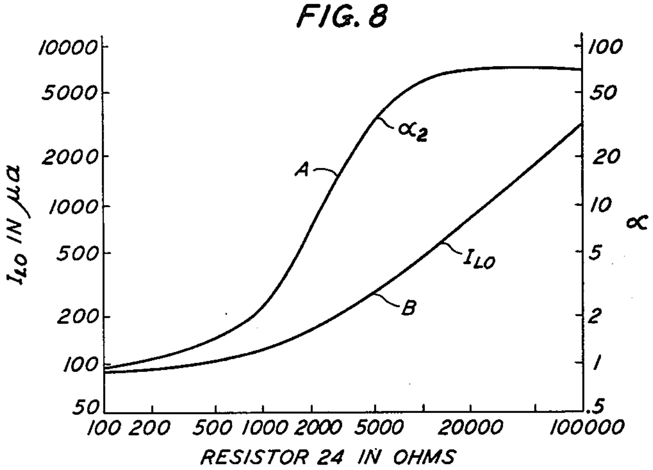
Figure 9:
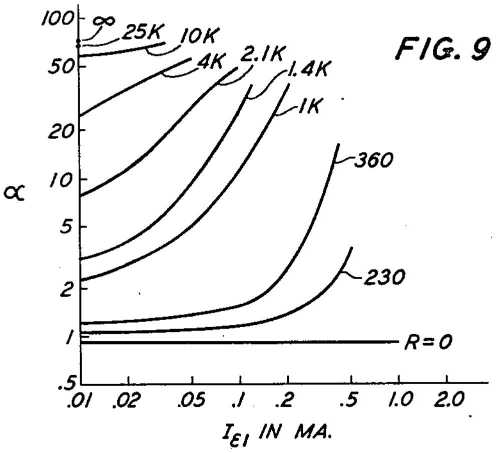
Figure 10:
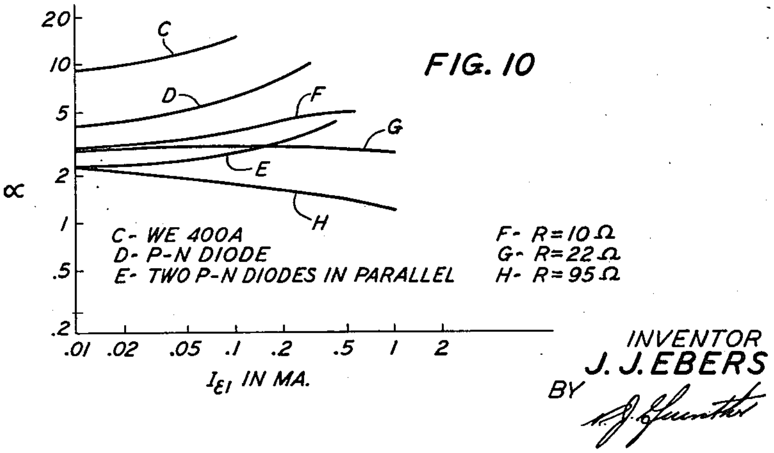

Several relationships, particularly significant performancewise, for a transistor of the construction illustrated in Fig. 3 and described hereinabove are depicted in Figs. 8, 9, and 10. In Fig. 8, is shown the relationship between alpha (curve A) and magnitude of the resistor 24 for the case where this is a linear resistor as shown at 24$_1$ in Fig. 3A. The relationship between load current, $I_L$, with zero emitter current and the magnitude of the resistor 24 is also shown in curve B. As is clear from this figure, both alpha and $I_{L0}$ increase with the resistance 24. However, it will be noted that the alpha approaches a maximum at a value of about 10,000 ohms for the resistor 24 and that at this point the saturation current is very small, approximately 500 microamperes. Also, it will be noted that the multiplication factor alpha can be varied over a wide range by a simple control of the resistor 24—for example from $\alpha=2$ to $\alpha=70$ by varying the resistor from about 1000 to 10,000 ohms.

Fig. 9 portrays the relationship between current multiplication factor alpha and emitter current $I_{E1}$ for a number of values of resistor 24$_1$, the resistance value being indicated on each of the curves. It will be evident from this family of curves that the performance characteristics of the transistor can be tailored readily for any prescribed emitter operating point.

Figure 3B:
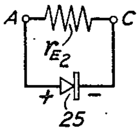

It will be noted from Fig. 9 that the $\alpha$ vs. $I_E$ characteristics are rather non-linear and that the slopes thereof are, in general, large for higher emitter currents. Both the non-linearity and the amplitude and sign of the slope are controllable as illustrated in Fig. 10. In this figure, curves C, D, and E represent the characteristics for the case where, as illustrated, the resistance 24 of Fig. 3 comprises an asymmetric diode 25 connected as shown in Fig. 3B. Specifically, as indicated by the legend in Fig. 10, curve C is for the case wherein the diode 25 is a germanium point contact type unit such as the commercially available Western Electric 400A varistor; curve B portrays the case where the diode 25 is a PN junction unit; and curve E represents the case where the diode 25 is comprised of a pair of PN junction units in parallel. For these cases, it will be seen, the $\alpha$ vs. $I_E$ characteristics closely approach linearity.

Figure 3C:
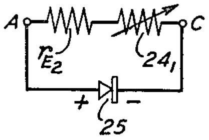

Curves F, G, and H of Fig. 10 show the relationship mentioned when the resistor 24 of Fig. 3 is composed of an asymmetric diode 25 and a series resistor 24$_1$, as shown in Fig. 3C, the diode 25 being a PN junction unit. For the curves F, G, and H, the resistor 24$_1$ of Fig. 3C was 10, 22, and 95 ohms, respectively, as indicated in the legend. As is evident from the curves, the $\alpha$ vs. $I_E$ characteristic may be made substantially linear and with a positive slope (F) or substantially linear and with a negative slope (G and H).

Although the invention has been described thus far with particular reference to semiconductor devices having substantially ohmic connections to each of four zones, it may be embodied also in devices of other and specifically different forms. For example, in the transistor illustrated in Fig. 4, the emitter comprises a point contact 26, for example of Phosphor bronze, bearing against the N zone 12 and defining a rectifying element therewith. The point contact 26 is subjected to an electrical forming treatment whereby, as illustrated in Fig. 4 a P type zone 11A and a junction $J_1$ are produced. Performancewise, the structure portrayed in Fig. 4 is essentially similar to that shown in Fig. 3 and discussed hereinabove.

Illustrative embodiments of this invention particularly useful as circuit controlling elements or switches are depicted in Figs. 5 and 6. In the former, as in Fig. 4, a device of PNPN configuration is provided by the combination of a two junction body 10 and an electrically formed point contact 26; in the device of Fig. 6 the body is of the construction illustrated in Figs. 1 and 3 and described heretofore. The operation of the devices represented in Figs. 5 and 6 will be apparent from the following analysis with particular reference to Fig. 7. The latter portrays the voltage (V)-current (I) characteristic of the devices, V and I having the significance indicated in Figs. 5 and 6.

Figure 7:
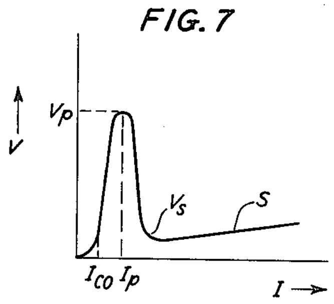

Specifically, as shown in Fig. 7, as the voltage V is increased from zero to a value $V_P$, the current increases slowly to a maximum and the resistance is positive and large. However, at the voltage $V_P$, the device triggers into a negative resistance state, indicated between $V_P$ and $V_S$, and thence to a high current, low resistance condition indicated at S in which the resistance is positive. Once this condition is established, the voltage V must be dropped to zero to return the devices to open condition. Thus, for zero or low values of $V_1$ the semiconductor devices of Figs. 5 and 6, viewed between the terminals E and C in the former and A and B in the latter, are in a low current or substantially open circuit condition whereas for values of V leading to the state indicated at S in Fig. 7 the devices are in the high current or closed circuit condition. Hence, these devices are eminently suitable for use as switches, for example as crosspoint switches in the telephone switching systems.

The specific form of the VI characteristic for any particular device is amenable to tailoring to meet particular requirements. For example, in the device of Fig. 5, the current, $I_{c0}$, shown in Fig. 7 may be varied by a factor of at least several tens through adjustment of either or both of the resistors 22 and 24. In a typical device such as depicted in Fig. 5 wherein the body 10 was of germanium and the zones 12, 13 and 14 were .060 inch, .002 inch and .060 inch thick, respectively, the body having a cross section of .030 inch by .030 inch throughout the three zones, the current $I_{c0}$ could be varied from approximately 1 to 100 microamperes by varying either or both of the resistors 22 and 24. In addition the value of $V_P$ shown in Fig. 7 could be varied from approximately 2 to 50 volts with a corresponding change in $I_P$.

Translating devices constructed in accordance with this invention may be utilized in a variety of applications in addition to those discussed thus far. For example, devices such as illustrated in Figs. 3 and 4, may be employed as modulator amplifiers. In such case a carrier signal is applied between the terminals E and $E_1$ and a modulating voltage is applied in series with the resistor 24 between the terminals A and C. Also, in a device of the configuration represented in Fig. 3, the resistor may be an indirectly heated thermistor, i. e., a resistor such as disclosed in Patent 2,280,257, granted April 21, 1942 to G. L. Pearson, having a high temperature coefficient of resistance, and a carrier signal applied between terminals E and $E_1$ may be modulated by applying the modulating voltage to the heater element of the thermistor.

Further, although the invention has been described with particular reference to devices wherein the semiconductive body is of PNPN configuration with the end P zone operated as the emitter zone, it will be understod that it may be embodied in devices wherein the emitter zone is of N type, the body then being of NPNP configuration.

Also, although specific embodiments of the invention have been shown and described, it will be understood that they are but illustrative and that various modifications may be made therein without departing from the scope and spirit of this invention.

Reference is made of the application Serial No. 300,220, filed July 22, 1952, of W. Shockley, and Serial No. 300,181, filed July 22, 1952, of L. B. Valdes, wherein related inventions are disclosed and claimed.

What is claimed is:

1. A signal translating device comprising a body of semiconductive material having therein four zones arranged in succession, adjacent zones being contiguous and of opposite conductivity types, individual electrical connections to said zones, means for impressing a signal between the connections to one of the end zones and the intermediate zone contiguous therewith, an output terminal on the connection to the other end zone, and a resistance between the connections to said other end zone and the intermediate zone contiguous therewith.

2. A signal translating device in accordance with claim 1 wherein said resistance has a linear current-voltage characteristic.

3. A signal translating device in accordance with claim 1 wherein said resistance has a nonlinear current-voltage characteristic.

4. A signal translating device in accordance with claim 1 wherein said resistance comprises a linear resistor and an asymmetric diode connected across said resistor.

5. A signal translating device comprising a semi-conductive body having therein four zones arranged in succession, adjacent zones being contiguous and of opposite conductivity types, whereby said zones define three successively arranged junctions, an input circuit connected between one end zone and the intermediate zone contiguous therewith, an output circuit connected between said intermediate zone and the other end zone and including means biasing the junction defined by said other end zone and the intermediate zone contiguous therewith in the forward direction, and means for controlling the potential of said other intermediate zone comprising an impedance connected between said other intermediate zone and one of the other zones.

6. A signal translating device comprising semiconductive means having a first zone of one conductivity type between and contiguous with a pair of zones of the opposite conductivity type, a base connection to one of said pair of zones, a collector connection to the other of said pair of zones, an emitter connection to said one zone, and means for controlling the relative potential of said first zone comprising a resistance connected between said first and other zones.

7. A signal translating device in accordance with claim 6 comprising a resistor connected between said base and emitter connections.

8. A signal translating device comprising a semiconductive element, means including a portion of said element constituting an emitter, means comprising a portion of said element constituting a hook collector including two zones of like conductivity type on opposite sides of and contiguous with an intermediate zone of the opposite conductivity type, a base connection to said element, an input connection to said emitter, an output connection to said collector, and means including a connection to said intermediate zone for controlling the potential of said intermediate zone.

9. A signal translating device comprising a body of semiconductive material having therein four zones arranged in succession, adjacent zones being contiguous and of opposite conductivity types, a first circuit connected between one end zone and the intermediate zone contiguous therewith, a second circuit connected between said intermediate zone and the other end zone, and means comprising an impedance connected between said other end zone and the intermediate zone contiguous therewith for controlling the potential of said last-mentioned intermediate zone.

10. A signal translating device in accordance with claim 9 wherein said impedance comprises a linear resistance.

11. A signal translating device in accordance with claim 9 wherein said impedance comprises a non-linear resistance.

12. A signal translating device in accordance with claim 9 wherein said impedance comprises an asymmetric diode in shunt with the junction between said other end zone and said last-mentioned intermediate zone.

13. A circuit controlling element comprising a body of semiconductive material having therein a first zone of one conductivity type between and contiguous with a pair of zones of the opposite conductivity type, a base connection to one of said pairs of zones, a point contact bearing against said one zone and connected with said base connection to a first terminal, a connection to the other of said pair of zones and extending to a second terminal, and a resistor connected between said other zone and said first zone.

14. A circuit controlling element comprising a semi-conductive body having therein four zones arranged in succession, adjacent zones being contiguous and of opposite conductivity types, individual substantially ohmic connections to said zones, a pair of terminals, a resistance connected between the connection to each of the intermediate zones and a respective one of said terminals, and the connection to each end zone extending to the terminal connected to the respective adjacent intermediate zones.

15. A transistor comprising an array of semiconductive elements defining a pair of PN junctions on opposite sides of a collector PN junction, means for applying a potential between the end elements of the array and of the polarity to bias said pair of junctions each in the forward direction and said collector junction in the reverse direction, means for applying a signal across one of said pairs of junctions, a load circuit connected across said collector junction and the other of said pair of junctions in series, and an impedance connected in parallel with said other junction.

16. A transistor comprising an array of semiconductive elements defining a pair of PN junctions on opposite sides of a collector PN junction, means for applying a potential between the end elements of the array and of the polarity to bias said pair of junctions each in the forward direction and said collector junction in the reverse direction, and means for controlling the current multiplication factor of the transistor comprising a variable resistance connected across one of said pairs of junctions.

17. A transistor comprising an array of semiconductive elements defining a pair of PN junctions on opposite sides of a collector PN junction, means for applying a potential between the end elements of the array and of the polarity to bias said pair of junctions each in the forward direction and said collector junction in the reverse direction, means for applying a signal across one of said pairs of junctions, a load circuit connected across said collector junction and the other of said pair of junctions in series, and means for controlling the emitter current-current multiplication factor characteristic of the transistor comprising a non-linear resistance connected across said other junction.

JEWELL J. EBERS.

No references cited.